United States Patent
Kano et al.

(10) Patent No.: US 10,404,201 B2
(45) Date of Patent: Sep. 3, 2019

(54) ROTARY ELECTRIC MACHINE CONTROLLER AND ELECTRIC POWER STEERING DEVICE USING THE SAME

(71) Applicant: DENSO CORPORATION, Kariya, Aichi-pref. (JP)

(72) Inventors: Ryo Kano, Kariya (JP); Takashi Suzuki, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 0 days.

(21) Appl. No.: 15/910,292

(22) Filed: Mar. 2, 2018

(65) Prior Publication Data

US 2018/0254734 A1    Sep. 6, 2018

(30) Foreign Application Priority Data

Mar. 6, 2017  (JP) .................. 2017-041686

(51) Int. Cl.
| | |
|---|---|
| *H02P 29/02* | (2016.01) |
| *B62D 5/04* | (2006.01) |
| *H02P 29/68* | (2016.01) |
| *H02P 27/08* | (2006.01) |
| *H02P 29/60* | (2016.01) |
| *H02P 29/032* | (2016.01) |
| *H02P 21/22* | (2016.01) |

(52) U.S. Cl.
CPC ............ *H02P 29/02* (2013.01); *B62D 5/0409* (2013.01); *B62D 5/0463* (2013.01); *B62D 5/0496* (2013.01); *H02P 27/08* (2013.01); *H02P 29/032* (2016.02); *H02P 29/60* (2016.02); *H02P 29/68* (2016.02); *H02P 21/22* (2016.02)

(58) Field of Classification Search
CPC .......... H02P 29/02; H02P 21/22; H02P 29/60; H02P 29/68
USPC ................................. 318/400.02
See application file for complete search history.

(56) References Cited

U.S. PATENT DOCUMENTS

| | | | |
|---|---|---|---|
| 8,674,641 B2 * | 3/2014 | Zhang | H02P 6/16 318/471 |
| 2008/0290842 A1 * | 11/2008 | Davis | B60L 7/24 320/166 |

(Continued)

FOREIGN PATENT DOCUMENTS

| | | | |
|---|---|---|---|
| JP | 2011-061950 A | | 3/2011 |
| JP | 2012070575 A | * | 4/2012 |
| JP | 2016-092944 A | | 5/2016 |

*Primary Examiner* — Kawing Chan
(74) *Attorney, Agent, or Firm* — Knobbe, Martens, Olson & Bear, LLP

(57) ABSTRACT

A capacitor current estimating unit estimates a capacitor current based on phase currents. A capacitor temperature estimating unit estimates a capacitor temperature based on the capacitor current. A motor controller can accurately estimate not only a temperature of a switching element but also the capacitor temperature based on the phase currents. As a result, the capacitor does not need to have excessive heat characteristics. Further, a current limiting unit limits a current flowing from a battery to an inverter based on the capacitor temperature. Therefore, an amount of temperature change is not over-estimated due to overheating of the capacitor. As a result, excessive current limitation can be avoided and the performance of the motor can be demonstrated.

9 Claims, 16 Drawing Sheets

(56) References Cited

U.S. PATENT DOCUMENTS

| | | | | |
|---|---|---|---|---|
| 2011/0254478 | A1* | 10/2011 | Poetzl | H02P 4/00 318/400.3 |
| 2014/0009093 | A1* | 1/2014 | Suzuki | H02P 21/0096 318/400.02 |
| 2015/0077029 | A1* | 3/2015 | Scotson | B60L 11/1803 318/400.22 |
| 2015/0115854 | A1* | 4/2015 | Pottebaum | H02P 6/10 318/445 |
| 2015/0130380 | A1* | 5/2015 | Kato | H02P 6/12 318/400.21 |
| 2015/0377808 | A1* | 12/2015 | Hironaka | H02M 1/32 318/139 |
| 2016/0036359 | A1* | 2/2016 | Nagata | H02P 29/68 318/400.1 |
| 2016/0126877 | A1 | 5/2016 | Endoh | |
| 2016/0197567 | A1* | 7/2016 | Nishiyama | H02P 6/10 318/400.17 |
| 2017/0331395 | A1* | 11/2017 | Kanazawa | H02P 27/08 |
| 2018/0058454 | A1* | 3/2018 | Nakagami | F04B 49/10 |

\* cited by examiner

ROTARY ELECTRIC MACHINE CONTROLLER AND ELECTRIC POWER STEERING DEVICE USING THE SAME

CROSS-REFERENCE TO RELATED APPLICATION

This application is based on and claims the benefit of priority from earlier Japanese Patent Application No. 2017-41686 filed Mar. 6, 2017, the description of which is incorporated herein by references.

TECHNICAL FIELD

The present disclosure relates to a rotary electric machine controller and an electric power steering device using the same.

BACKGROUND

Conventionally, a rotary electric machine controller that estimates the temperature of coils or electronic components constituting an inverter and prevents overheating by limiting a current command value is known.

Japanese Patent Application Laid-Open Publication No. 2016-92944 (Patent Document 1) discloses a rotary electric machine controller that estimates the temperature of switching elements and limits an output of the power converter.

There is a possibility that other parts such as a capacitor cannot be protected merely by estimating the temperature of the switching elements as in the configuration of Patent Document 1.

In addition, an amount of change in temperature may be over-estimated and the current may be excessively limited due to overheating of the capacitor.

As a result, there is a possibility that the performance of the motor which is the rotary electric machine cannot be exhibited.

In order to protect the capacitor of other parts, the capacitor must have an exclusive temperature estimating means, or the capacitor must have excessive heat characteristics so that the temperature does not rise above that of the switching element.

SUMMARY

An embodiment provides a rotary electric machine controller that improves accuracy of temperature estimation of a capacitor and avoids excessive current limitation being imposed on the rotary electric machine, and an electric power steering device using the same.

A first aspect of a rotary electric machine controller of the present disclosure controls a rotary electric machine having three or more phase having at least one winding set.

The rotary electric machine controller includes an inverter, a capacitor, and a current detecting unit. In addition, the rotary electric machine controller includes a capacitor current estimating unit, a capacitor temperature estimating unit, a limiting current calculating unit, and a current limiting unit.

The inverter is provided for each winding set respectively, has a plurality of switching elements, and electric power is supplied thereto from a power supply.

The capacitor is connected to the power supply and smooths the voltage of the power supply.

The current detecting unit detects the current flowing in the rotary electric machine.

The capacitor current estimating unit estimates the current flowing in the capacitor based on the current flowing through the rotary electric machine.

The capacitor temperature estimating unit estimates the temperature of the capacitor based on the current flowing through the capacitor.

The limiting current calculating unit calculates a limiting current which is a limiting value of the current flowing from the power supply to the inverter based on the temperature of the capacitor.

The current limiting unit limits the current flowing from the power supply to the inverter based on the limiting current.

The capacitor current estimating unit estimates the current flowing in the capacitor based on the current flowing through the rotary electric machine.

The capacitor temperature estimating unit estimates the temperature of the capacitor based on the current flowing through the capacitor.

Since it is based on the current flowing through the rotary electric machine, not only can the temperature of the switching element be estimated but also the temperature of the capacitor can be accurately estimated by the rotary electric machine controller.

In addition, the current limiting unit limits the current flowing from the battery to the inverter based on the temperature of the capacitor.

Therefore, the amount of temperature change is not over-estimated due to overheating of the capacitor. As a result, excessive current limitation can be avoided and the performance of the motor can be demonstrated.

The present disclosure is also provided as a rotary electric machine that outputs assist torque for assisting steering by a driver and an electric power steering device using the rotary electric machine controller.

The electric power steering device of the present disclosure has the same effect as the rotary electric machine controller.

DETAILED DESCRIPTION OF THE PREFERRED EMBODIMENTS

Figure 1:
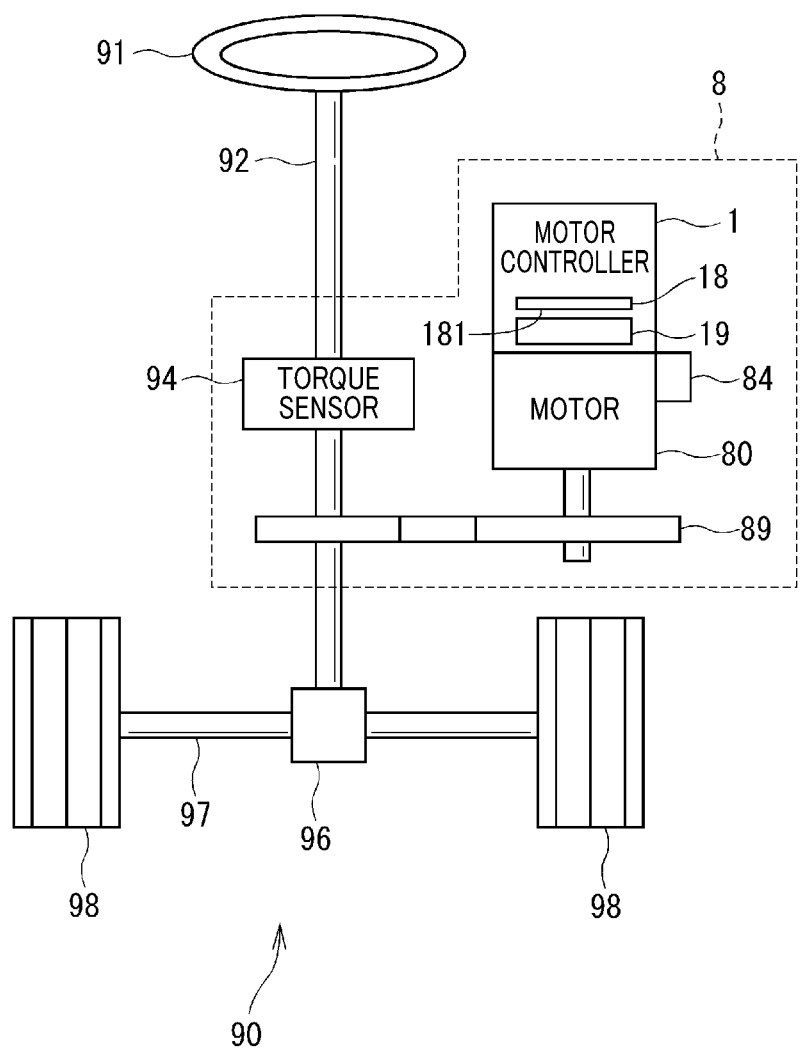
FIG. 1 shows a schematic configuration diagram of a steering system according to a first embodiment of the present disclosure.

Hereinafter, a rotary electric machine controller and an electric power steering device using the same according to embodiments of the present disclosure will be described with reference to the drawings.

It should be appreciated that, in a plurality of embodiments, substantially the same configuration will be denoted by the same reference numerals, and redundant description thereof will be omitted.

When referred to as the present embodiment, plural embodiments are included.

First, an electric power steering device 8 using a motor controller as a rotary electric machine controller of the present embodiment will be described.

As shown in FIG. 1, the electric power steering device 8 is used in a steering system 90. The steering system 90 is mounted on a vehicle and includes a steering wheel 91, a steering shaft 92, a torque sensor 94, a pinion gear 96, a rack shaft 97, wheels 98 and the electric power steering device 8.

The steering wheel 91 is a steering member and is connected to the steering shaft 92. A torque inputted by operating the steering wheel 91 by a driver is defined as a steering torque. The pinion gear 96 is disposed at a distal end of the steering shaft 92.

The torque sensor 94 detects the steering torque. The detected steering torque is outputted to a control unit 30 of a motor controller 1.

The pinion gear 96 meshes with the rack shaft 97. A pair of wheels 98 are connected to both ends of the rack shaft 97 via tie rods or the like.

The electric power steering device 8 includes a reduction gear 89, a motor 80 as a rotary electric machine, a rotation angle sensor 84, and the motor controller 1.

The electric power steering device 8 of the present embodiment is a so-called column-assist type. It should be noted that the electric power steering device 8 may be a so-called rack-assist type that transmits a rotation of the motor 80 to the rack shaft 97.

The reduction gear 89 reduces the speed of the motor 80 and transmits the rotation thereof to the steering shaft 92.

A torque assisting the steering of the steering wheel 91 by the driver is defined as an assist torque.

The motor 80 outputs the assist torque. Electric power is supplied from a battery 9 as a power source to the motor 80, and the motor 80 is driven. The reduction gear 89 is rotated forwardly and reversely by the motor 80.

The rotation angle sensor 84 is, for example, a resolver, and detects an electrical angle θ of the motor 80. The detected electrical angle θ is outputted to the control unit 30.

Further, the rotation angle sensor 84 calculates a rotation angular velocity ω of the motor 80 based on the electrical angle θ.

First Embodiment

Figure 2:
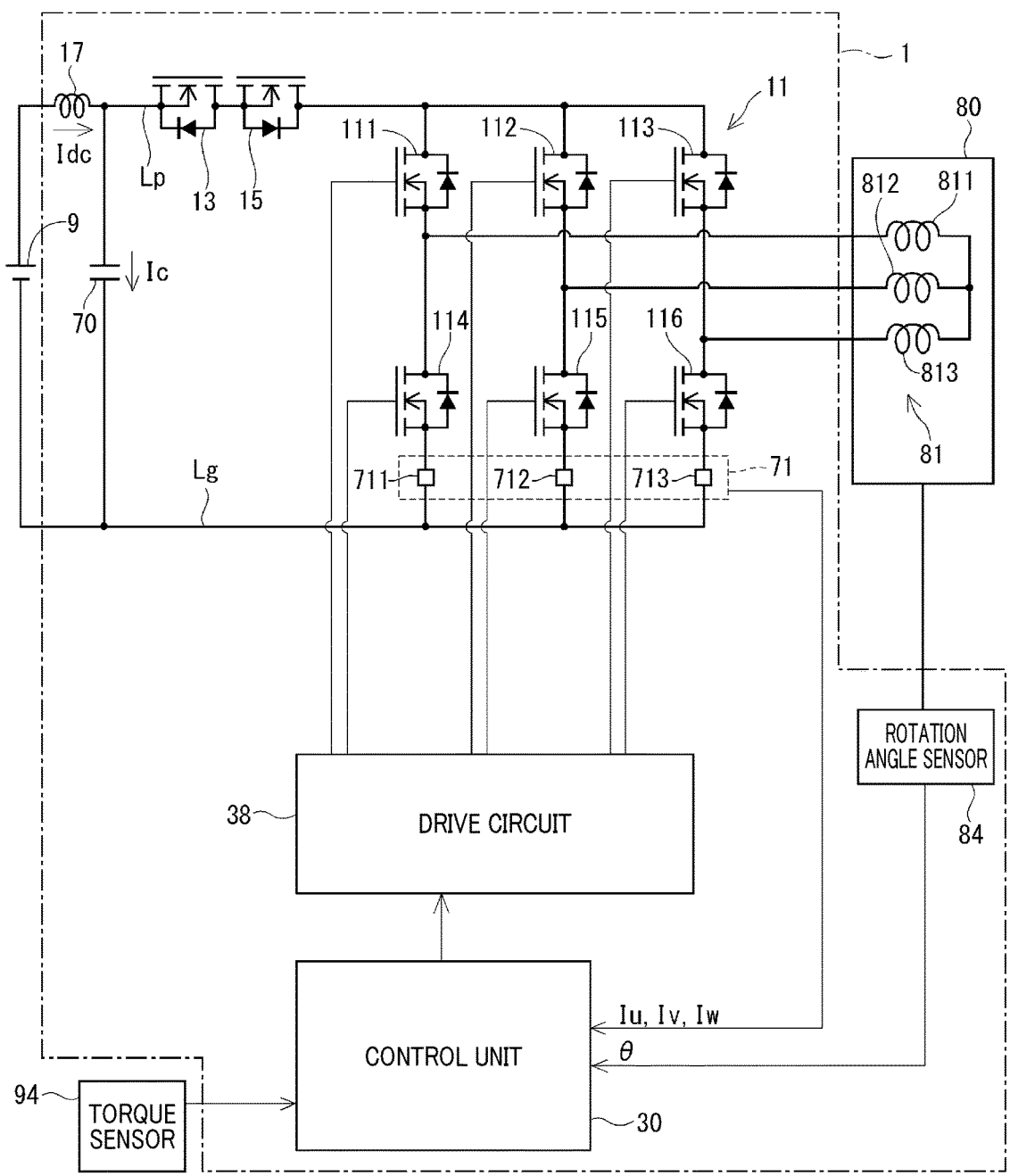
FIG. 2 shows a circuit diagram of a motor controller according to the first embodiment of the present disclosure.

As shown in a circuit diagram of FIG. 2, the motor 80 is a multiphase AC motor. The motor 80 is a three-phase AC motor and is a brushless motor in the present embodiment.

The motor 80 has a winding set 81. The winding set 81 includes a U-phase coil 811, a V-phase coil 812, and a W-phase coil 813.

One ends of the coils 811, 812, 813 are connected to an inverter 11, and other ends thereof are connected to each other.

The motor controller 1 includes the inverter 11, a capacitor 70, a power supply relay 13, a reverse connection protection relay 15, a current detecting unit 71, a choke coil 17, a circuit board 18, a heat sink 19, and the control unit 30.

The motor controller 1 is disposed near one end in an axial direction of the motor 80. The motor controller 1 and the motor 80 are integrated. The motor controller 1 and the motor 80 may be separated.

The inverter 11 is provided corresponding to the winding set 81 and is a three-phase inverter. The inverter 11 has a plurality of switching elements 111 to 116.

The switching elements 111 to 113 are connected to a high potential side of the circuit. When appropriate, the switching elements 111 to 113 are referred to as high-potential switching elements 111 to 113. The remaining switching elements 114 to 116 are connected to a low potential side.

A connection point of the paired U phase switching elements 111 and 114 is connected to the U phase coil 811. A connection point of the paired V phase switching elements 112 and 115 is connected to the V phase coil 812. A connection point of the paired W phase switching elements 113 and 116 is connected to the W phase coil 813.

The switching elements 111 to 116 are MOSFETs. Note that the switching elements 111 to 116 may be IGBTs.

The inverter 11 is connected in parallel to the battery 9 as a power source. The capacitor 70 is connected in parallel with the battery 9.

Further, the capacitor 70 suppresses normal mode noise from being generated from the battery 9. Furthermore, the capacitor 70 smooths a variation of a voltage from the battery 9. A current flowing through the capacitor 70 is referred to as a capacitor current Ic.

The power supply relay 13 is disposed corresponding to the winding set 81, and the power supply relay 13 is disposed between the battery 9 and the inverter 11, and is connected to a high potential line Lp.

The power supply relay 13 is a MOSFET. It should be noted that the power supply relay 13 may be an IGBT or a mechanical relay.

The reverse connection protection relay 15 is provided between the inverter 11 and the power supply relay 13. In addition, the reverse connection protection relay 15 is a MOSFET, like the power supply relay 13.

Further, the reverse connection protection relay 15 is connected so that a direction of a parasitic diode thereof is opposite to that of the power supply relay 13.

The reverse connection protection relay 15 interrupts a reverse current from the inverter 11 to the power supply relay 13 when the battery 9 is connected in a reverse direction. Thereby, the reverse connection protection relay 15 protects the motor controller 1.

A combination of the winding set 81, the inverter 11, the power supply relay 13, and the reverse connection protection relay 15 which are disposed correspondingly is defined as a system.

The number of systems is referred to as N. N is a natural number. In the first embodiment, N=1.

The current detecting unit 71 has current detection elements 711 to 713.

The current detection element 711 is disposed between the switching element 114 and a ground line Lg, and detects a U-phase current Iu flowing through the U-phase coil 811.

The current detection element 712 is disposed between the switching element 115 and the ground line Lg, and detects a V-phase current Iv flowing through the V-phase coil 812.

The current detection element 713 is disposed between the switching element 116 and the ground line Lg, and detects a W-phase current Iw flowing through the W-phase coil 813.

The current detection elements 711 to 713 are shunt resistors. The current detection elements 711 to 713 may be Hall elements. The current detecting unit 71 outputs a detection value to the control unit 30.

The choke coil 17 has a structure in which one conductor is wound around one core, and is disposed between the battery 9 and the power supply relay 13. The choke coil 17 generates a magnetic flux when a current flows.

Due to the generated magnetic flux, the choke coil 17 functions as an inductor and suppresses noise from being generated.

A current flowing from the battery 9 to the choke coil 17 is defined as a power supply current Idc.

The inverter 11, the capacitor 70, the power supply relay 13, the reverse connection protection relay 15, the current detecting unit 71, the choke coil 17, and the control unit 30 are mounted on a heat sink side surface 181 of the circuit board 18.

The heat sink 19 has a plurality of fins which are heat dissipation plates, and dissipates the heat of the switching elements 111 to 116.

The control unit 30 is mainly composed of a microcomputer or the like. Each process in the control unit 30 may be a software process performed by executing a program stored in advance in a substantive memory device such as a ROM by a CPU, or may be a hardware process performed by a dedicated electronic circuit.

The control unit 30 performs current feedback control based on the steering torque, the electrical angle θ, the phase currents Iu, Iv, Iw, etc., and controls the motor 80 by PWM (pulse width modulation) control.

Figure 3:
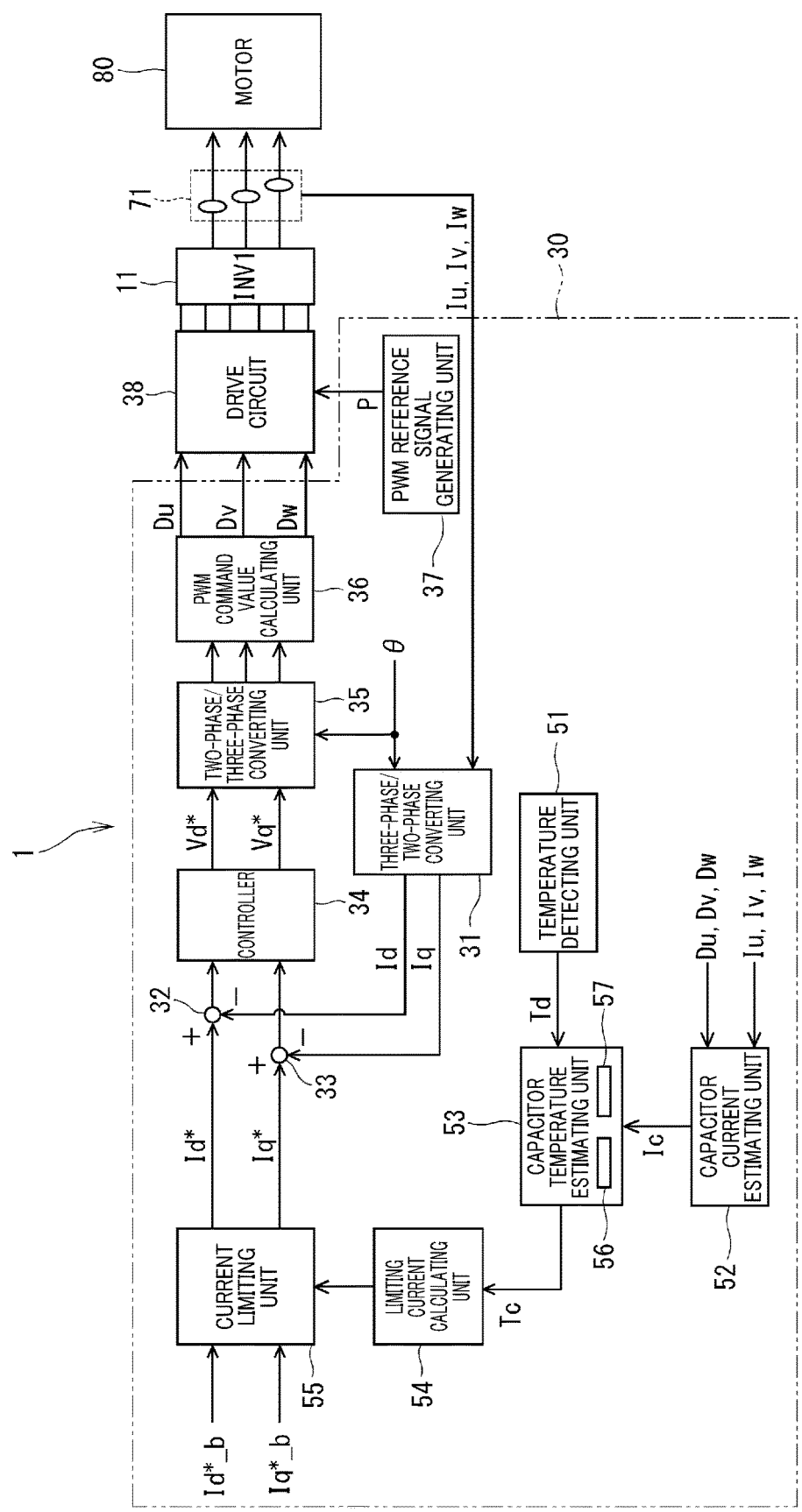
FIG. 3 shows a block diagram of a control unit of the motor controller according to the first embodiment of the present disclosure.

As shown in FIG. 3, the control unit 30 includes a three-phase/two-phase converting unit 31, subtracters 32 and 33, a controller 34, a two-phase/three-phase converting unit 35, a PWM command value calculating unit 36, and a PWM reference signal generating unit 37.

The three-phase/two-phase converting unit 31 dq-converts the phase currents Iu, Iv, Iw based on the electrical angle θ.

Further, the three-phase/two-phase converting unit 31 calculates a d-axis current detection value Id and a q-axis current detection value Iq.

The subtracter 32 calculates a deviation ΔId between a d-axis current command value Id* and the d-axis current detection value Id.

The subtracter 33 calculates a deviation ΔIq between a q-axis current command value Iq* and the q-axis current detection value Iq.

The controller 34 calculates a d-axis voltage command value Vd* and a q-axis voltage command value Vq* by PI calculation or the like so that the deviations ΔId and ΔIq converge to zero.

The two-phase/three-phase converting unit 35 inversely dq-converts the d-axis voltage command value Vd* and the q-axis voltage command value Vq* based on the electrical angle θ.

One set of ON and OFF states of the switching elements 111 to 116 is defined as a switching cycle. A ratio of an ON period with respect to the switching cycle is defined as a duty.

The PWM command values related to the electric power applied to the respective phase windings 811 to 813 are defined as the respective phase duties Du, Dv, Dw [%].

The U phase duty Du corresponds to the U phase. The V phase duty Dv corresponds to the V phase. The W phase duty Dw corresponds to the W phase.

The PWM command value calculating unit 36 calculates each phase duty Du, Dv, Dw corresponding to each phase based on the d-axis voltage command value Vd* and the q-axis voltage command value Vq* that are inversely dq-converted.

The PWM reference signal generating unit 37 generates a PWM reference signal P. The PWM reference signal P is a triangular wave signal corresponding to each phase duty Du, Dv, Dw. The PWM reference signal P is a carrier wave or carrier.

The control unit 30 generates a control signal for the inverter 11 based on the phase duties Du, Dv, Dw. The generated control signal is transmitted to the inverter 11 via the drive circuit 38, and the control unit 30 controls the on/off operation of the switching elements 111 to 116.

The PWM control of the control unit 30 will be described with reference to FIG. 4 and FIG. 5. FIG. 5 is an enlarged view of a period KO of FIG. 4.

Figure 4:
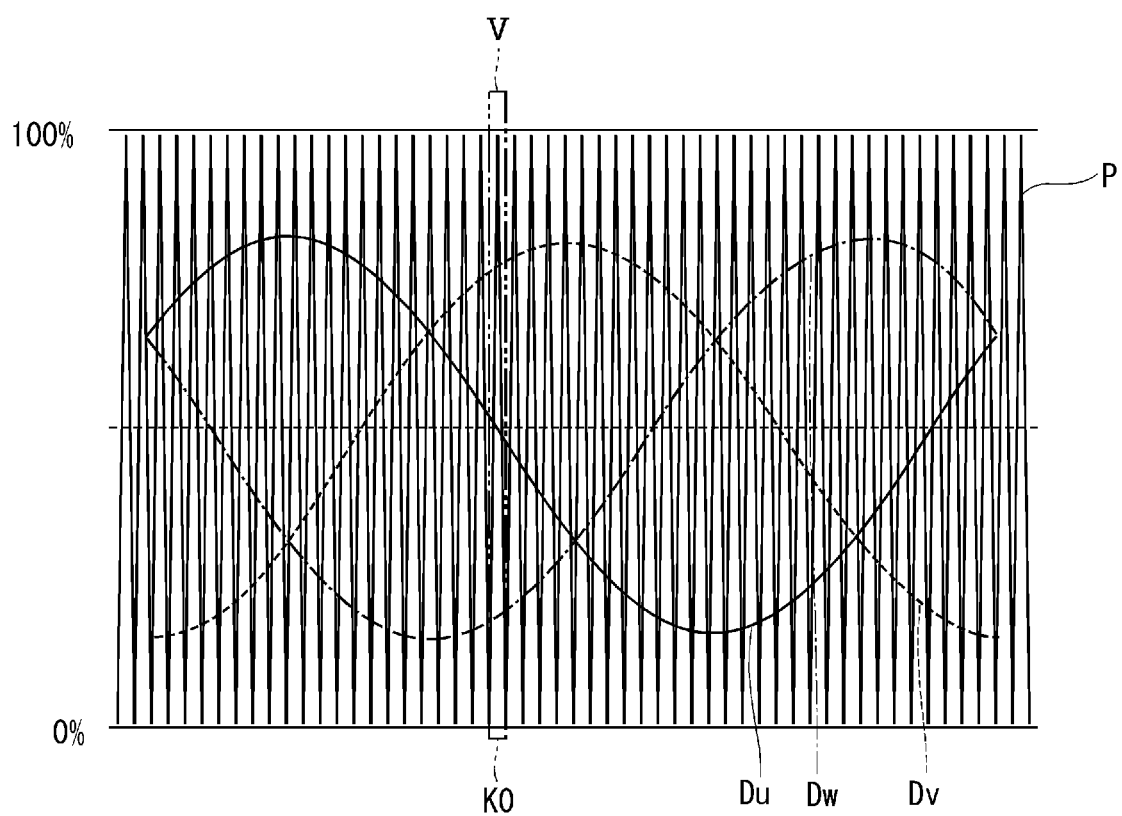
FIG. 4 shows an explanatory diagram illustrating a PWM of the control unit according to the first embodiment of the present disclosure.
Figure 5:
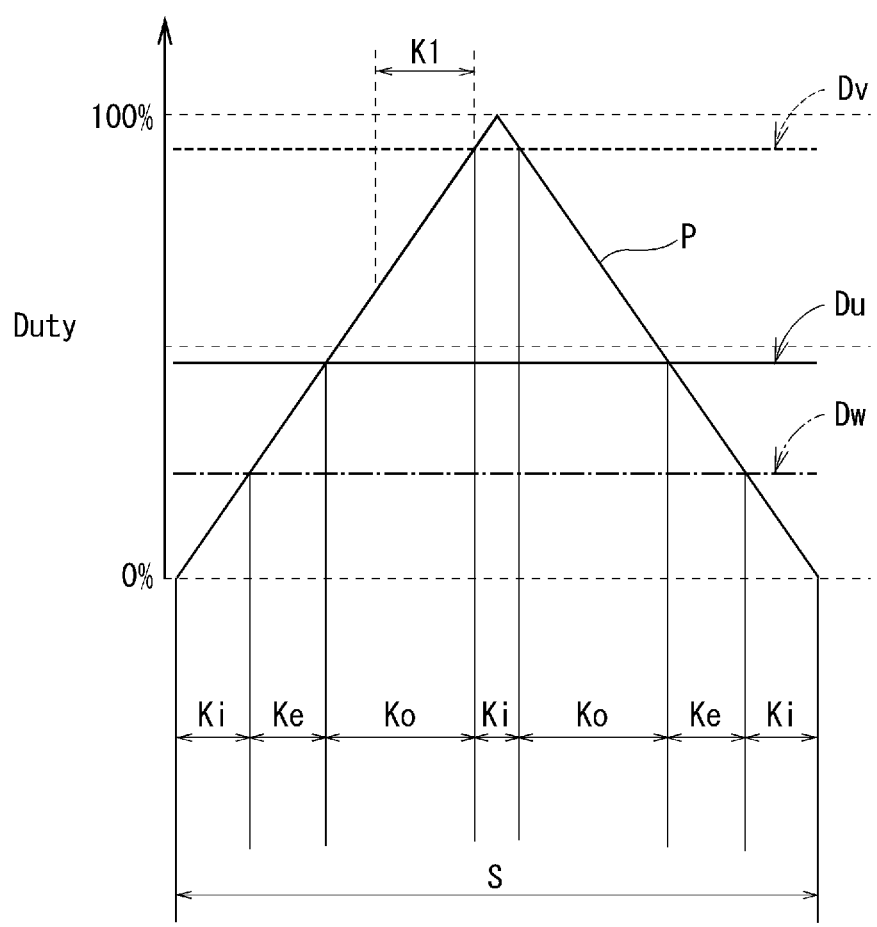
FIG. 5 shows an enlarged view of a part V of FIG. 4.

As shown in FIG. 4, the phase duties Du, Dv, Dw are compared with the PWM reference signal P, and ON/OFF signals of the switching elements 111 to 116 are generated.

In FIG. 4, the U-phase duty Du is indicated by a solid line. In addition, the V-phase duty Dv is indicated by a broken line. Further, the W-phase duty Dw is indicated by a dashed line.

Moreover, the phase duties Du, Dv, Dw and the PWM reference signal P are in a range of 0-100%. It should be noted that the range of each of the phase duties Du, Dv, Dw and the PWM reference signal P may be arbitrarily set.

In periods in which the PWM reference signal P exceeds the phase duties Du, Dv, Dw, the switching elements 111 to 113 are turned off, and the corresponding switching elements 114 to 116 are turned on.

In periods in which the PWM reference signal P falls below the phase duties Du, Dv, Dw, the switching elements 111 to 113 are turned on, and the corresponding switching elements 114 to 116 are turned off.

As shown in FIG. 5, for example, in a period Ki, the PWM reference signal P is located below the V phase duty Dv and is located above the U phase duty Du and the W phase duty Dw. At this time, the switching element 112 is turned on and the switching element 115 is turned off for the V phase.

The switching elements 111 and 113 are turned off and the switching elements 114 and 116 are turned on for the U phase and the W phase.

When the PWM reference signal P is 0%, it is defined as a trough of the PWM reference signal P.

An interval of one cycle of the PWM reference signal P is defined as a control cycle S. The control cycle S is a period from the trough of the PWM reference signal P to the other trough of the PWM reference signal P.

Conventionally, a rotary electric machine controller that estimates the temperature of coils or electronic components constituting an inverter and prevents overheating by limiting a current command value is known.

There is a possibility that other parts such as a capacitor cannot be protected merely by estimating the temperature of the switching elements.

In addition, an amount of change in temperature may be over-estimated and the current may be excessively limited due to overheating of the capacitor.

As a result, there is a possibility that the performance of the motor which is the rotary electric machine cannot be exhibited.

In order to protect the capacitor, the capacitor must have an exclusive temperature estimating means, or the capacitor must have excessive heat characteristics so that the temperature does not rise above the switching element.

Therefore, an accuracy of a temperature estimation of the capacitor is improved in the rotary electric machine controller of the present embodiment, and an excessive current limitation being imposed on the rotary electric machine is avoided.

The control unit 30 further includes a temperature detecting unit 51, a capacitor current estimating unit 52, a capacitor temperature estimating unit 53, a limiting current calculating unit 54, and a current limiting unit 55.

A thermistor which is a ceramic semiconductor of which electric resistance varies according to the temperature is used as the temperature detecting unit 51, for example.

The temperature of the circuit board 18 is defined as a circuit board temperature Tb. The circuit board temperature Tb also includes the ambient temperature around the circuit board 18.

The temperature of the heat sink 19 is defined as a heat sink temperature Th.

The ambient temperature outside the motor controller 1 is defined as an outside air temperature Ta.

Further, the temperature detecting unit 51 detects the circuit board temperature Tb, the heat sink temperature Th or the outside air temperature Ta.

The temperature detected by the temperature detecting unit 51 is defined as a detected temperature Td. The temperature detecting unit 51 outputs the detected temperature Td to the capacitor temperature estimating unit 53.

A period where all the high-potential switching elements 111 to 113 are on or off is defined as an invalid voltage period Ki. The ratio of the invalid voltage period Ki with respect to the control cycle S is defined as an invalid period ratio Pi [%].

A period where at least one of the high-potential switching elements 111 to 113 is ON, and when a voltage is applied to the winding set 81 is defined as a valid voltage period Kv.

The ratio of the valid voltage period Kv with respect to the control cycle S is defined as a valid period ratio Pv [%].

A period when an odd number of high potential switching elements 111 to 113 are ON, and when a voltage the is applied to winding set 81 is defined as an odd number voltage period Ko. The odd number voltage period Ko with respect to the control cycle S is defined as an odd number period ratio Po [%].

A period when an even number of high potential switching elements 111 to 113 are ON, and when a voltage is applied to the winding set 81 is defined as an even number voltage period Ke. The even number voltage period Ke with respect to the control cycle S is defined as an even number period ratio Pe [%].

Note that the valid voltage period Kv is a period obtained by combining the odd number voltage period Ko and the even number voltage period Ke.

The capacitor current estimating unit 52 calculates the capacitor current Ic based on the phase currents Iu, Iv, Iw, the respective phase duties Du, Dv, Dw, the invalid period ratio Pi, the odd number period ratio Po, and the even number period ratio Pe.

The capacitor current Ic is set, for example, so that the Relational Expression (1) is satisfied, while t represents time.

An integral value of a square value of the capacitor current Ic is defined as a current square integrated value Ci.

Io is a value represented by the phase currents Iu, Iv and Iw when Io is the odd number voltage period Ko.

Ie is a value represented by the phase currents Iu, Iv, and Iw when Ie is the even number voltage period Ke.

[Math 1]

$$Ci = \int (Ic)^2 dt = \left[\frac{Pi}{100} \times (Idc)^2 + \frac{Po}{100} \times (Idc - Io)^2 + \frac{Pe}{100} \times (Idc - Ie)^2\right] \times S \qquad \text{Expression (1)}$$

When all the high-potential switching elements 111 to 113 are OFF, that is, when it is un an invalid voltage period Ki, the capacitor current Ic is expressed by the following Relational Expression (2).

When only one high-potential switching element 111 is ON, that is, when it is the odd number voltage period Ko, the capacitor current Ic is expressed by the following Relational Expression (3). At this time, Io corresponds to the U-phase current Iu.

When two high-potential switching elements 111 and 113 are ON, that is, when it is in an even number voltage period Ke, the capacitor current Ic is expressed by the following Relational Expression (4). At this time, Ie corresponds to the sum Iu+Iw of the U-phase current Iu and the W-phase current Iw.

$$Ic = Idc \qquad (2)$$

$$Ic = Idc - Iu \qquad (3)$$

$$Ic = Idc - Iu - Iw \qquad (4)$$

The capacitor current estimating unit 52 outputs the current square integrated value Ci to the capacitor temperature estimating unit 53.

The temperature of the capacitor 70 is defined as a capacitor temperature Tc.

The capacitor temperature estimating unit 53 estimates the capacitor temperature Tc based on the capacitor current Ic and the detected temperature Td.

The capacitor temperature estimating unit 53 includes a first filter 56 and a second filter 57. The filters 56 and 57 receive the current square integrated value Ci and output a first-order lag response of the current square integrated value Ci. In addition, the filters 56 and 57 each have different time constants.

The time constant of the filters 56 and 57 is set, for example, by analyzing a response characteristic waveform. The time constant of the first filter 56 is set to be larger than the time constant of the second filter 57. Note that the filters 56 and 57 are the same as the filters disclosed in Patent Document 1.

As shown in the Relational Expression (5), the capacitor temperature estimating unit 53 multiplies the current square integrated value Ci that has passed through the first filter 56 by a first gain G1 and calculates a first temperature change amount $\Delta Tc1$ which is a change amount of the capacitor temperature Tc.

$$\Delta Tc1 = G1 \times Ci \quad (5)$$

Further, as shown in the Relational Expression (6), the capacitor temperature estimating unit 53 multiplies the current square integrated value Ci that has passed through the second filter 57 by a second gain G2 and calculates a second temperature change amount $\Delta Tc2$ which is a change amount of the capacitor temperature Tc.

$$\Delta Tc2 = G2 \times Ci \quad (6)$$

Further, as shown in the Relational Expression (7), the capacitor temperature estimating unit 53 adds the first temperature change amount $\Delta Tc1$ and the second temperature change amount $\Delta Tc2$ to the detected temperature Td, and calculates the capacitor temperature Tc.

The capacitor temperature estimating unit 53 outputs the capacitor temperature Tc to the limiting current calculating unit 54.

$$Tc = \Delta Tc1 + \Delta Tc2 + Td \quad (7)$$

A limiting value of the d-axis current detection value Id is defined as a d-axis limiting current Id_lim. A limiting value of the q-axis current detection value Iq is defined as a q-axis limiting current Iq_lim.

The limiting current calculating unit 54 calculates the limiting currents Id_lim and Iq_lim based on the capacitor temperature Tc.

Figure 6:
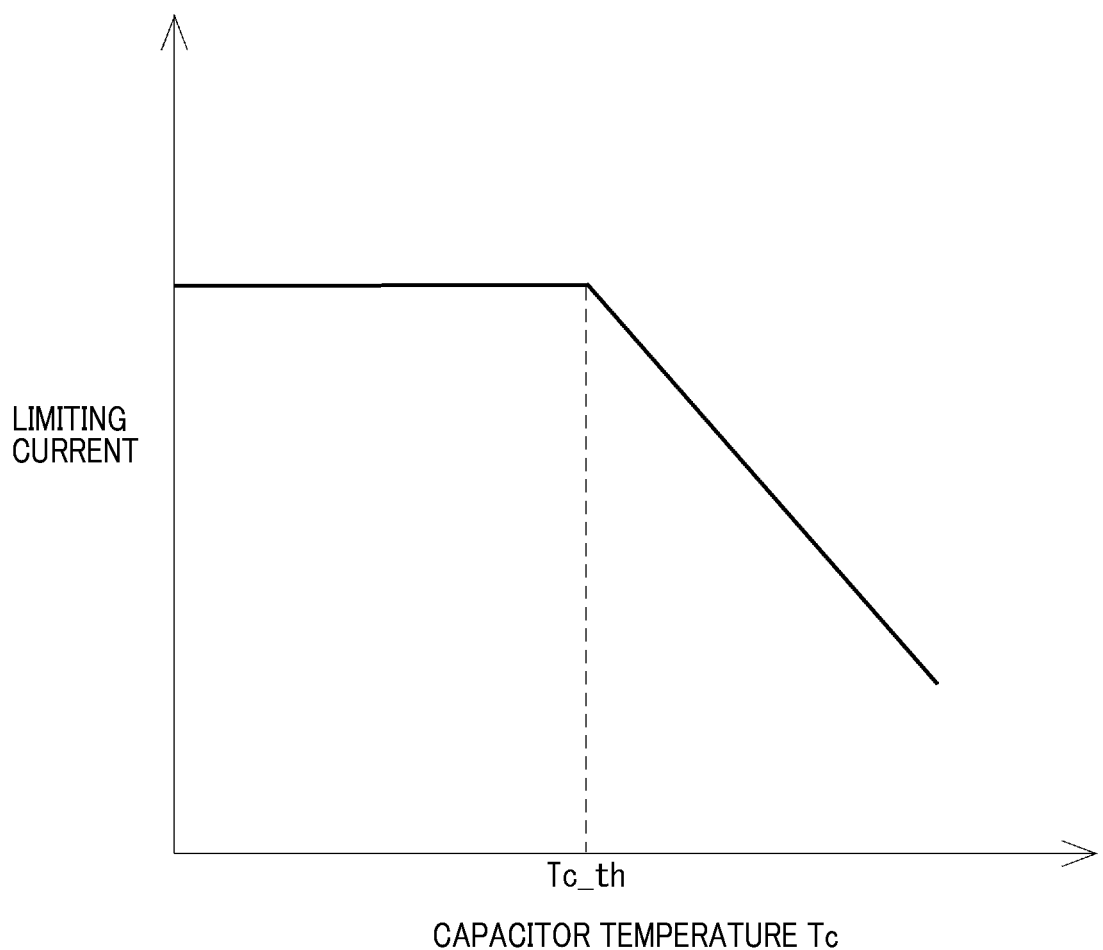
FIG. 6 shows a relationship diagram of a capacitor temperature and a limiting current of the motor controller according to the first embodiment of the present disclosure.

As shown in FIG. 6, when the capacitor temperature Tc is equal to or lower than Tc_th, the limiting currents Id_lim and Iq_lim are set to be constant.

Further, when the capacitor temperature Tc is higher than Tc_th, the limiting currents Id_lim and Iq_lim are set to decrease as the capacitor temperature Tc increases.

The limiting current calculating unit 54 outputs the calculated limiting currents Id_lim and Iq_lim to the current limiting unit 55.

The current command value determined based on the torque command value and the like and before being limited is defined as pre-limiting current command values Id*_b, Iq*_b.

When a pre-limiting d-axis current command value Id*_b is larger than the d-axis limiting current Id_lim, the current limiting unit 55 sets the d-axis current command value Id* as the d-axis limiting current Id_lim.

When a pre-limiting q-axis current command value Iq*_b is larger than the q-axis limiting current Iq_lim, the current limiting unit 55 sets the q-axis current command value Iq* as the q-axis limiting current Iq_lim.

Figure 7:
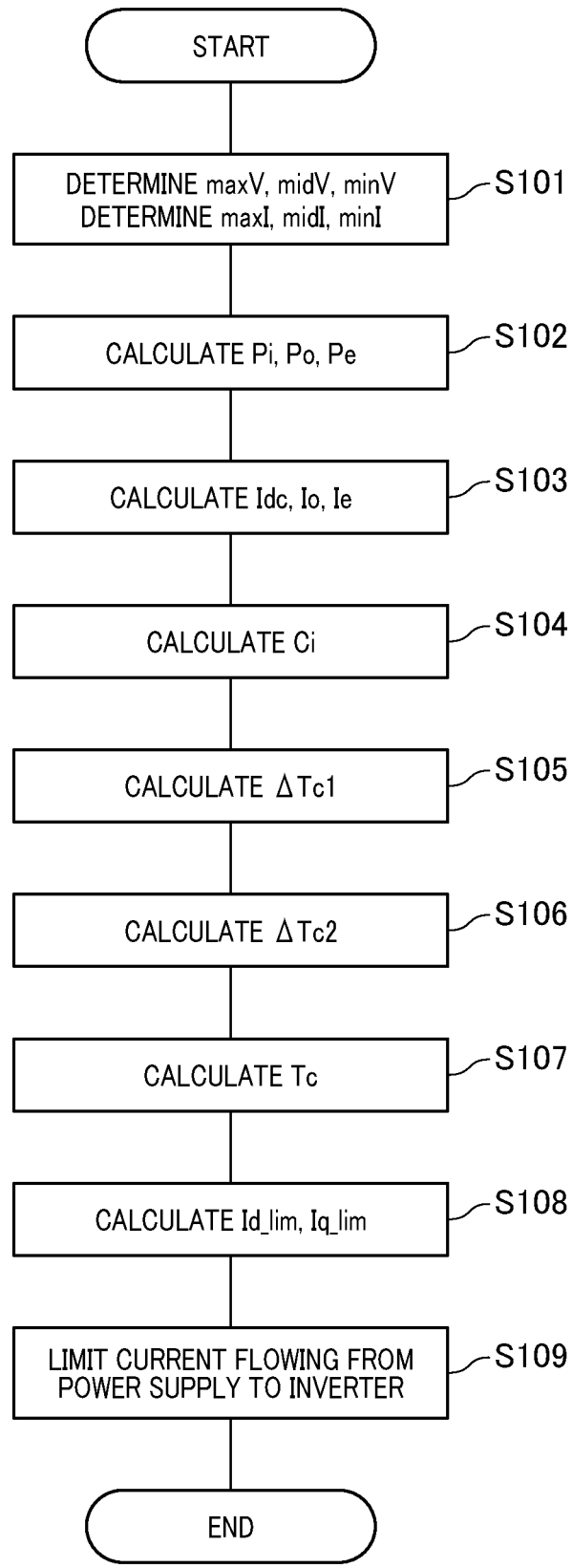
FIG. 7 shows a flowchart for explaining the processing of the control unit of the motor controller according to the first embodiment of the present disclosure.

The processing of the control unit 30 will be described with reference to a flowchart of FIG. 7.

In the flowchart, a symbol S means a step.

The phase duties Du, Dv, Dw are set to maxV, midV, minV in descending order.

Further, the phase currents Iu, Iv, Iw corresponding to maxV, midV, minV are set to maxI, midI, minI, respectively.

In step 101, the capacitor current estimating unit 52 determines maxV, midV, minV, maxI, midI, minI.

In step 102, the capacitor current estimating unit 52 calculates the invalid period ratio Pi, the odd number period ratio Po, and the even number period ratio Pe as shown in the following Relational Expressions (8) to (10).

$$Pi = 100 - \max V + \min I \quad (8)$$

$$Po = \max V - \min V \quad (9)$$

$$Pe = \text{mid} V - \min V \quad (10)$$

In step 103, the capacitor current estimating unit 52 calculates the power supply current Idc, the odd number period current Io, and the even number period current Ie as shown in the following Relational Expressions (11) to (13).

$$Idc = Du \times Iu + Dv \times Iv + Dw \times Iw \quad (11)$$

$$Io = \max I \quad (12)$$

$$Ie = \min I \quad (13)$$

In step 104, the capacitor current estimating unit 52 calculates the current square integrated value Ci.

In step 105, the first filter 56 performs filter processing on the current square integrated value Ci, and the capacitor temperature estimating unit 53 calculates the first temperature change amount $\Delta Tc1$.

In step 106, the second filter 57 performs filter processing on the current square integrated value Ci, and the capacitor temperature estimating unit 53 calculates the second temperature change amount $\Delta Tc2$.

In step 107, the capacitor temperature estimating unit 53 calculates the capacitor temperature Tc.

In step 108, the limiting current calculating unit 54 calculates the limiting currents Id_lim and Iq_lim based on the capacitor temperature Tc.

In step 109, the current limiting unit 55 limits the current flowing from the battery 9 to the inverter 11 based on the limiting currents Id_lim and Iq_lim.

Hereinafter, effects of the first embodiment will be described.

The capacitor current estimating unit 52 estimates the capacitor current Ic based on the phase currents Iu, Iv, and Iw. The capacitor temperature estimating unit 53 estimates the capacitor temperature Tc based on the capacitor current Ic.

Since the capacitor current estimating unit 52 is estimated based on the phase currents Iu, Iv, Iw, not only can the temperature of the switching element be estimated but also the capacitor temperature Tc can be accurately estimated.

The capacitor temperature estimating unit 53 preferably estimates the capacitor temperature Tc based on the phase currents Iu, Iv, Iw and the respective phase duties Du, Dv, Dw.

Thereby, there is no need to provide a dedicated capacitor temperature estimating means, and the capacitor 70 does not need to have excessive heat characteristics.

Further, the current limiting unit 55 limits the current flowing from the battery 9 to the inverter 11 based on the capacitor temperature Tc.

Therefore, the amount of temperature change is not overestimated due to overheating of the capacitor 70.

As a result, excessive current limitation can be avoided and the performance of the motor 80 can be demonstrated.

Second Embodiment

In a second embodiment, it is the same as in the first embodiment except that the number N of systems is two.

Figure 8:
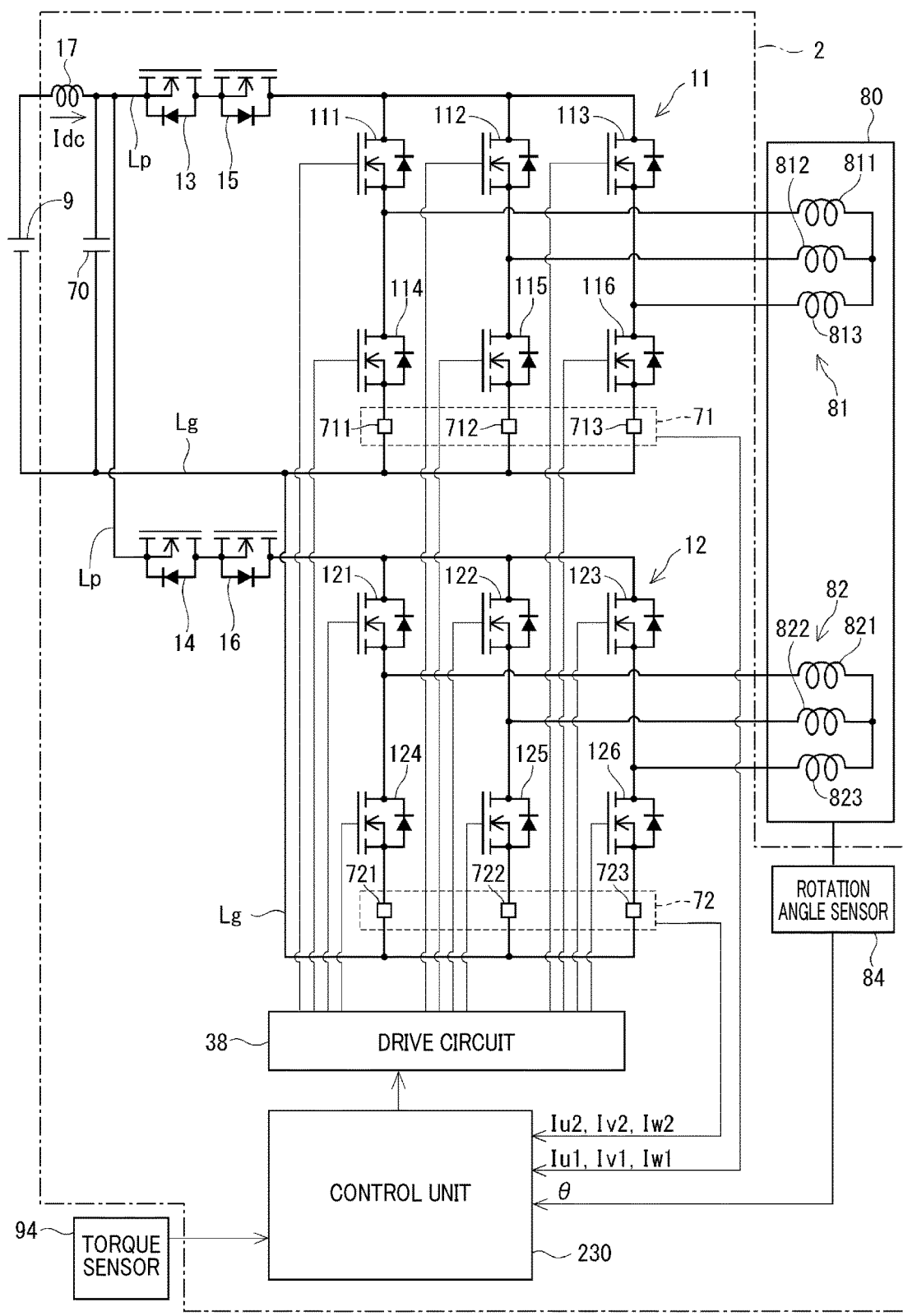
FIG. 8 shows a circuit diagram of a motor controller according to a second embodiment of the present disclosure.

As shown in FIG. 8, a motor controller 2 of the second embodiment includes winding sets 81, 82, inverters 11, 12, power relays 13, 14, reverse connection protection relays 15, 16, and current detecting units 71, 72.

One of the systems is a first system while another one is a second system.

The inverter 11 of the first system has a plurality of first switching elements 111 to 116 as in the first embodiment. The inverter 12 of the second system has a plurality of second switching elements 121 to 126.

A connection point of the paired U phase second switching elements 121 and 124 is connected to the U phase coil 821. A connection point of the paired V phase second switching elements 122 and 125 is connected to the V phase coil 822. A connection point of the paired W phase second switching elements 123 and 126 is connected to the W phase coil 823.

Similar to the first switching elements 111 to 116, the second switching elements 121 to 126 are MOSFETs.

Similar to the first current detecting unit 71, the second current detecting unit 72 includes a plurality of second current detection elements 721 to 723.

Similar to the first current detection elements 711 to 713, the second current detection elements 721 to 723 are shunt resistors.

The control unit 230 controls the motor 80 by current feedback control based on the steering torque, the electrical angle θ, the phase currents Iu1, Iv1, Iw1, Iu2, Iv2, Iw2 and the like.

Figure 9:
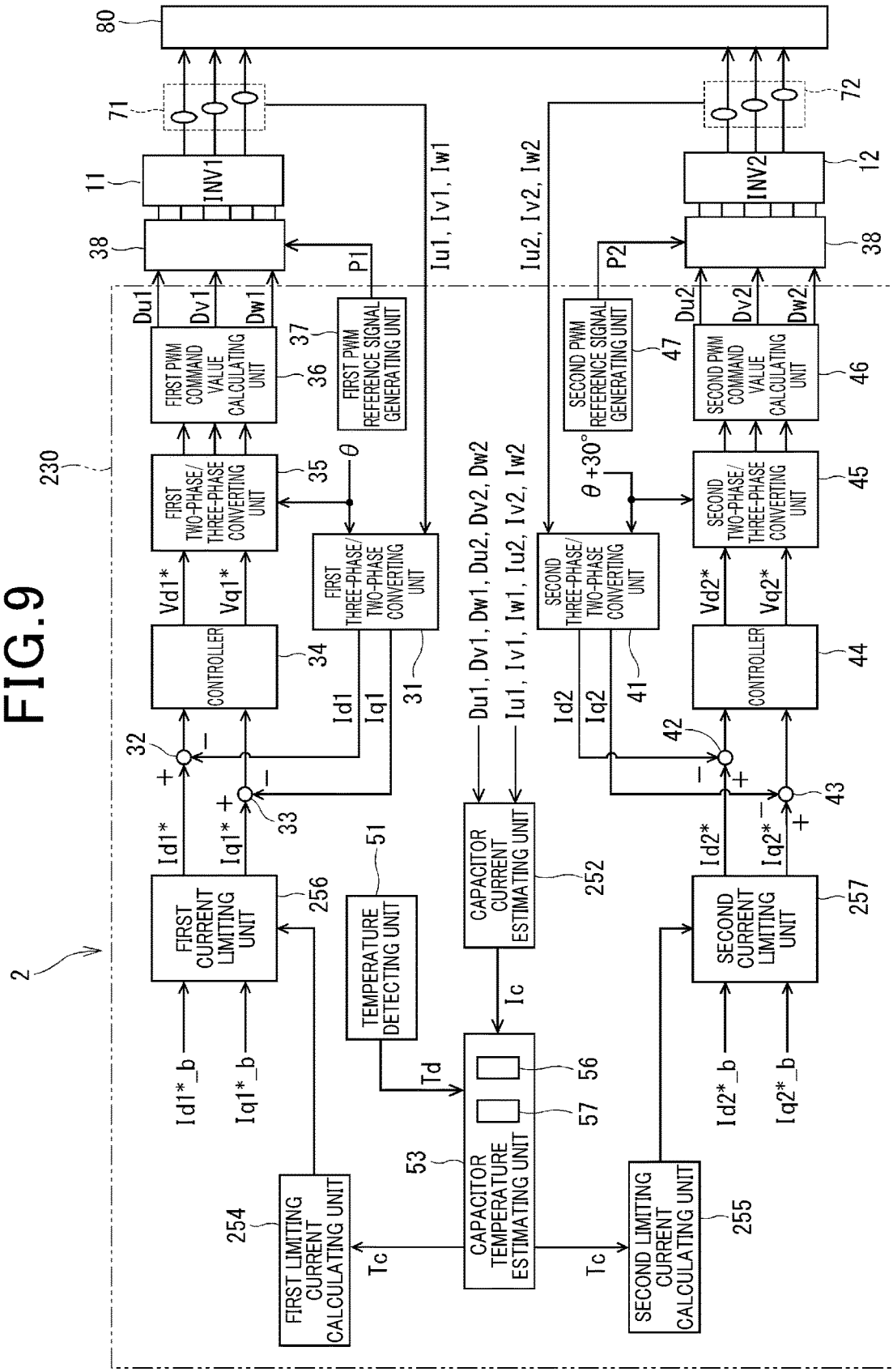
FIG. 9 shows a block diagram of a control unit of the motor controller according to the second embodiment of the present disclosure.

As shown in FIG. 9, the control unit 230 includes three-phase/two-phase converting units 31 and 41, subtracters 32, 33, 42 and 43, controllers 34 and 44, two-phase/three-phase converting units 35 and 45, PWM command value calculating units 36 and 46, and PWM reference signal generation units 37 and 47. In FIG. 9, description of the drive circuit 38 is omitted.

The first system three-phase/two-phase converting unit 31 dq-converts the phase currents Iu1, Iv1, Iw1 based on the electrical angle θ.

Further, the first system three-phase/two-phase converting unit 31 calculates a first d-axis current detection value Id1 and a first q-axis current detection value Iq1.

The subtracter 32 calculates a deviation ΔId1 between a first d-axis current command value Id1* and the first d-axis current detection value Id1. The subtracter 33 calculates a deviation ΔIq1 between a first q-axis current command value Iq1* and the first q-axis current detection value Iq1.

The controller 34 calculates a first d-axis voltage command value Vd1* and a first q-axis voltage command value Vq1* by PI calculation or the like so that the deviations ΔId1, ΔIq1 converge to zero.

The first system two-phase/three-phase converting unit 35 inversely dq-converts the first d-axis voltage command value Vd1* and the first q-axis voltage command value Vq1* based on the electrical angle θ.

The first PWM command value calculating unit 36 calculates each first duties Du1, Dv1, Dw1 based on the first d-axis voltage command value Vd1* and the first q-axis voltage command value Vq1* that are inversely dq-converted.

The first PWM reference signal generating unit 37 generates a first PWM reference signal P1 corresponding to the first duties Du1, Dv1, Dw1.

The second system three-phase/two-phase converting unit 41 dq-converts the phase currents Iu2, Iv2, Iw2 based on the electrical angle θ.

In addition, the second system three-phase/two-phase converting unit 41 calculates a second d-axis current detection value Id2 and a second q-axis current detection value Iq2.

The subtracter 42 calculates a deviation ΔId2 between a second d-axis current command value Id2* and the second d-axis current detection value Id2. The subtracter 43 calculates a deviation ΔIq2 between a second q-axis current command value Iq2* and a second q-axis current detection value Iq2.

The controller 44 calculates a second d-axis voltage command value Vd2* and a second q-axis voltage command value Vq2* by PI calculation or the like so that the deviations ΔId2, ΔIq2 converge to zero.

The second system two-phase/three-phase converting unit 45 inversely dq-converts the second d-axis voltage command value Vd2* and the second q-axis voltage command value Vq2* based on the electrical angle θ.

The first winding set 81 and the second winding set 82 are arranged so as to be shifted by a predetermined electrical angle (for example, 30 degrees), and power of which phases are shifted in accordance with the deviation of the electrical angle is supplied to the winding sets 81 and 82.

The second PWM command value calculating unit 46 calculates each second duties Du2, Dv2, Dw2 based on the second d-axis voltage command value Vd2* and the second q-axis voltage command value Vq2* that are inversely dq-converted.

The second PWM reference signal generating unit 47 generates a second PWM reference signal P2 corresponding to the second duties Du2, Dv2, Dw2.

In addition, the control unit 230 further includes a temperature detecting unit 51, a capacitor current estimating unit 252, a capacitor temperature estimating unit 53, two limiting current calculating units 254, 255, and two current limiting units 256, 257.

The temperature detecting unit 51, the capacitor temperature estimating unit 53, the limiting current calculating units 254, 255, and the current limiting units 256, 257 of the second embodiment are the same as those of the first embodiment.

The capacitor current estimating unit 252 calculates the capacitor current Ic based on the phase currents Iu1, Iv1, Iw1, Iu2, Iv2, Iw2, and the duties Du1, Dv1, Dw1, Du2, Dv2, Dw2.

Further, the capacitor current estimating unit 252 calculates the capacitor current Ic also based on the invalid period ratio Pi, the odd number period ratio Po, and the even number period ratio Pe.

When all of the first high-potential switching element 111 to 113 and the second high-potential switching element 121 to 123 are OFF, it is the invalid voltage period Ki in the first system and the second system.

At this time, the capacitor current Ic is expressed by the following Relational Expression (14).

$$Ic=Idc \tag{14}$$

When one first high-potential switching element 111 is ON and all of the second high-potential switching elements 121 to 123 are OFF, it is the odd number voltage period Ko in the first system and the invalid voltage period Ki in the second system.

At this time, the capacitor current Ic is expressed by the following Relational Expression (15).

$$Ic=Idc-Iu1 \tag{15}$$

When two first high-potential switching elements 111, 112 are ON and all of the second high-potential switching elements 121 to 123 are OFF, it is the even number voltage period Ke in the first system, and the invalid voltage period Ki in the second system.

At this time, the capacitor current Ic is expressed by the following Relational Expression (16).

$$Ic=Idc-Iu1-Iv1 \tag{16}$$

When two first high-potential switching elements 111, 112 are ON and one second high-potential switching element 121 is ON, it is the even number voltage period Ke in the first system, and the odd number voltage period Ko in the second system.

At this time, the capacitor current Ic is expressed by the following Relational Expression (17).

$$Ic=Idc-Iu1-Iv1-Iu2 \tag{17}$$

When one of the first system and the second system is the invalid voltage period Ki and the other of the first system or the second system is the odd number voltage period Ko, the capacitor current Ic can be expressed in the same manner as in the Relational Expression (15).

When one of the first system and the second system is the invalid voltage period Ki and the other of the first system or the second system is the even number voltage period Ke, the capacitor current Ic can be expressed in the same manner as in the Relational Expression (16).

When one of the first system and the second system is the odd number voltage period Ko and the other of the first system or the second system is the even number voltage period Ke, the capacitor current Ic can be expressed in the same manner as in the Relational Expression (17).

Figure 10:
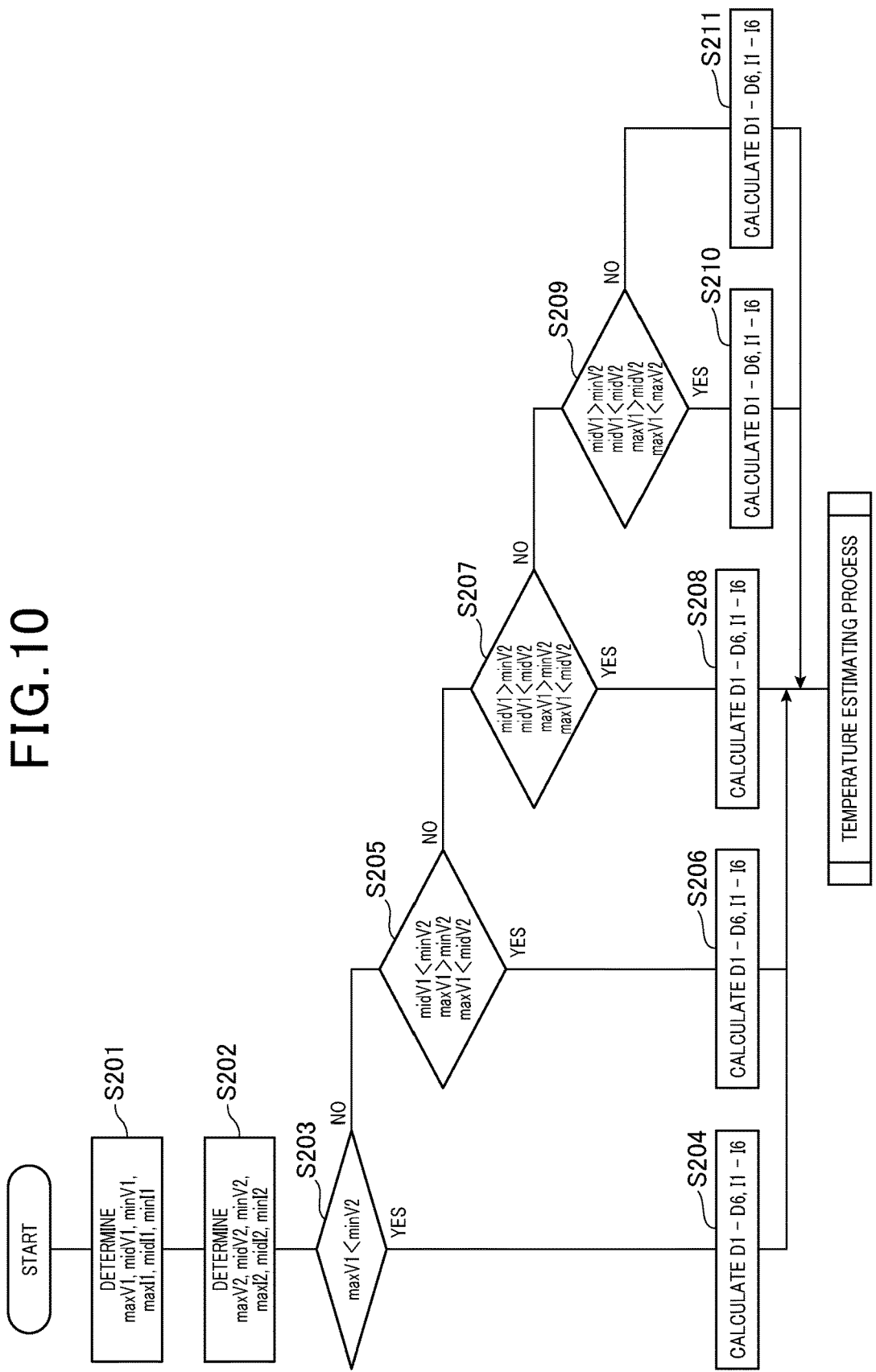
FIG. 10 shows a flowchart for explaining the processing of the control unit of the motor controller according to the second embodiment of the present disclosure.

The processing of the control unit 230 will be described with reference to the flowcharts of FIG. 10 and FIG. 11.

The first duties Du1, Dv1, Dw1 are set to maxV1, midV1, minV1 in descending order.

Further, the phase currents Iu1, Iv1, Iw1 corresponding to maxV1, midV1, minV1 are set to maxI1, midI1, minI1, respectively.

In step 201, the capacitor current estimating unit 252 determines maxV1, midV1, minV1, maxI1, midI1, minI1.

The second duties Du2, Dv2, Dw2 are set to maxV2, midV2, minV2 in descending order.

Further, the phase currents Iu2, Iv2, Iw2 corresponding to maxV2, midV2, minV2 are set to maxI2, midI2, minI2.

In step 202, the capacitor current estimating unit 252 determines maxV2, midV2, minV2, maxI2, midI2, minI2.

Six variables calculated based on the states of the first and second systems and maxV1, midV1, minV1, maxV2, midV2, minV2 are defined as duty variables D1 to D6 [%].

Six variables calculated based on the states of the first and second systems and maxI1, midI1, minI1, maxI2, midI2, minI2 are defined as current variables I1 to I6.

In step 203, the capacitor current estimating unit 252 compares maxV1 with minV2.

When maxV1 is smaller than minV2, the process proceeds to step 204.

When maxV1 is equal to or greater than minV2, the process proceeds to step 205.

In step 204, the capacitor current estimating unit 252 calculates the duty variables D1 to D6 as expressed by the following Relational Expressions (18) to (23).

Figure 12:
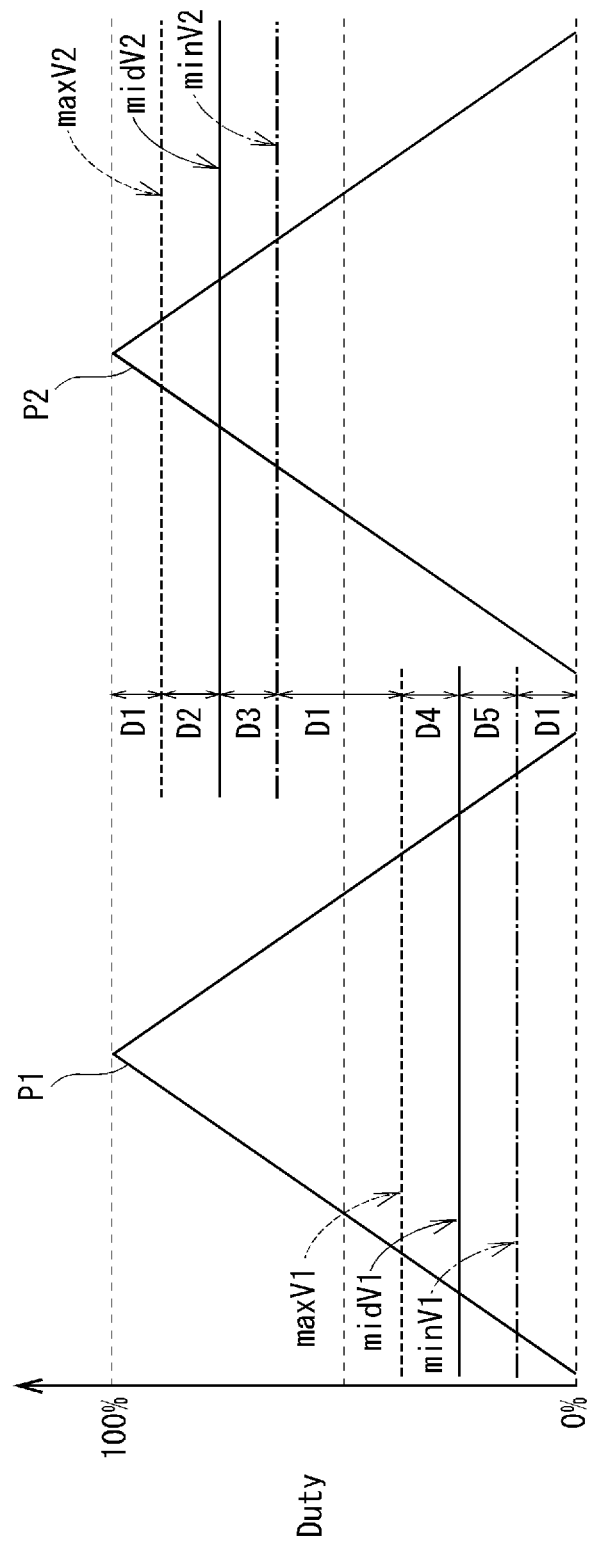
FIG. 12 shows a relationship diagram of a reference signal and a duty variable of the motor controller according to the second embodiment of the present disclosure.

The relationship between the duty variables D1 to D6 and maxV1, midV1, minV1, maxV2, midV2, minV2 at this time is shown in FIG. 12.

$$D1=100-(D2+D3+D4+D5) \tag{18}$$

$$D2=maxV2-midV2 \tag{19}$$

$$D3=midV2-minV2 \tag{20}$$

$$D4=maxV1-midV1 \tag{21}$$

$$D5=midV1-minV1 \tag{22}$$

$$D6=0 \tag{23}$$

In addition, the capacitor current estimating unit 252 calculates the current variables I1 to I6 as expressed by the following Relational Expressions (24) to (29).

$$I1=Idc \tag{24}$$

$$I2=Idc-maxI2 \tag{25}$$

$$I3=Idc-(maxI2+midI2) \tag{26}$$

$$I4=Idc-maxI1 \tag{27}$$

$$I5=Idc-(maxI1+midI1) \tag{28}$$

$$I6=0 \tag{29}$$

In step 205, the capacitor current estimating unit 252 compares midV1 and minV2. In addition, the capacitor current estimating unit 252 compares maxV1 and minV2. Further, the capacitor current estimating unit 252 compares maxV1 with midV2.

When midV1 is smaller than minV2, maxV1 is greater than minV2, and maxV1 is smaller than midV2, the process proceeds to step 206.

When midV1 is equal to or greater than minV2, maxV1 is equal to minV2 or less, or maxV1 is equal to or greater than midV2, the process proceeds to step 207.

In step 206, the capacitor current estimating unit 252 calculates the duty variables D1 to D6 as expressed by the following Relational Expressions (30) to (35).

Figure 13:
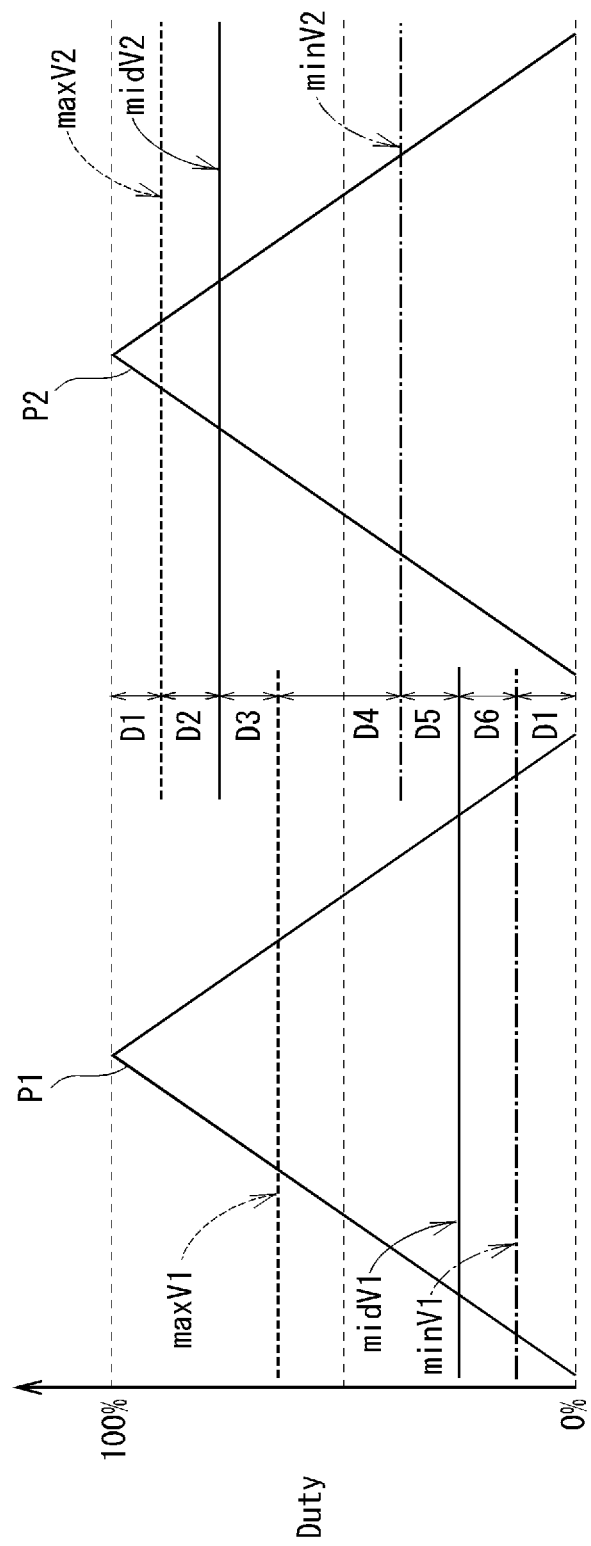
FIG. 13 shows another relationship diagram of the reference signal and the duty variable of the motor controller according to the second embodiment of the present disclosure.

The relationship between the duty variables D1 to D6 and maxV1, midV1, minV1, maxV2, midV2, minV2 at this time is shown in FIG. 13.

$$D1=100-(D2+D3+D4+D5+D6) \tag{30}$$

$$D2=maxV2-midV2 \tag{31}$$

$$D3=midV2-maxV1 \tag{32}$$

$$D4=maxV1-minV2 \tag{33}$$

$$D5=minV2-midV1 \tag{34}$$

$$D6=midV1-minV1 \tag{35}$$

In addition, the capacitor current estimating unit 252 calculates the current variables I1 to I6 as expressed by the following Relational Expressions (36)-(41).

$$I1 = Idc \tag{36}$$

$$I2 = Idc - \text{max}I2 \tag{37}$$

$$I3 = Idc - (\text{max}I2 + \text{mid}I2) \tag{38}$$

$$I4 = Idc - \text{max}I1 - (\text{max}I2 + \text{mid}I2) \tag{39}$$

$$I5 = Idc - \text{max}I1 \tag{40}$$

$$I6 = Idc - (\text{max}I1 + \text{mid}I1) \tag{41}$$

In step 207, the capacitor current estimating unit 252 compares midV1 with minV2. Further, the capacitor current estimating unit 252 compares midV1 with midV2. Furthermore, the capacitor current estimating unit 252 compares maxV1 with minV2. Moreover, the capacitor current estimating unit 252 compares maxV1 with midV2.

When midV1 is larger than minV2, midV1 is smaller than midV2, maxV1 is larger than minV2, and maxV1 is smaller than midV2, the process proceeds to step 208.

When midV1 is equal to minV2 or less, midV1 is equal to midV2 or more, maxV1 is equal to minV2 or less, or maxV1 is equal to midV2 or more, the process proceeds to step 209.

In step 208, the capacitor current estimating unit 252 calculates the duty variables D1 to D6 as expressed by the following Relational Expressions (42) to (47).

Figure 14:
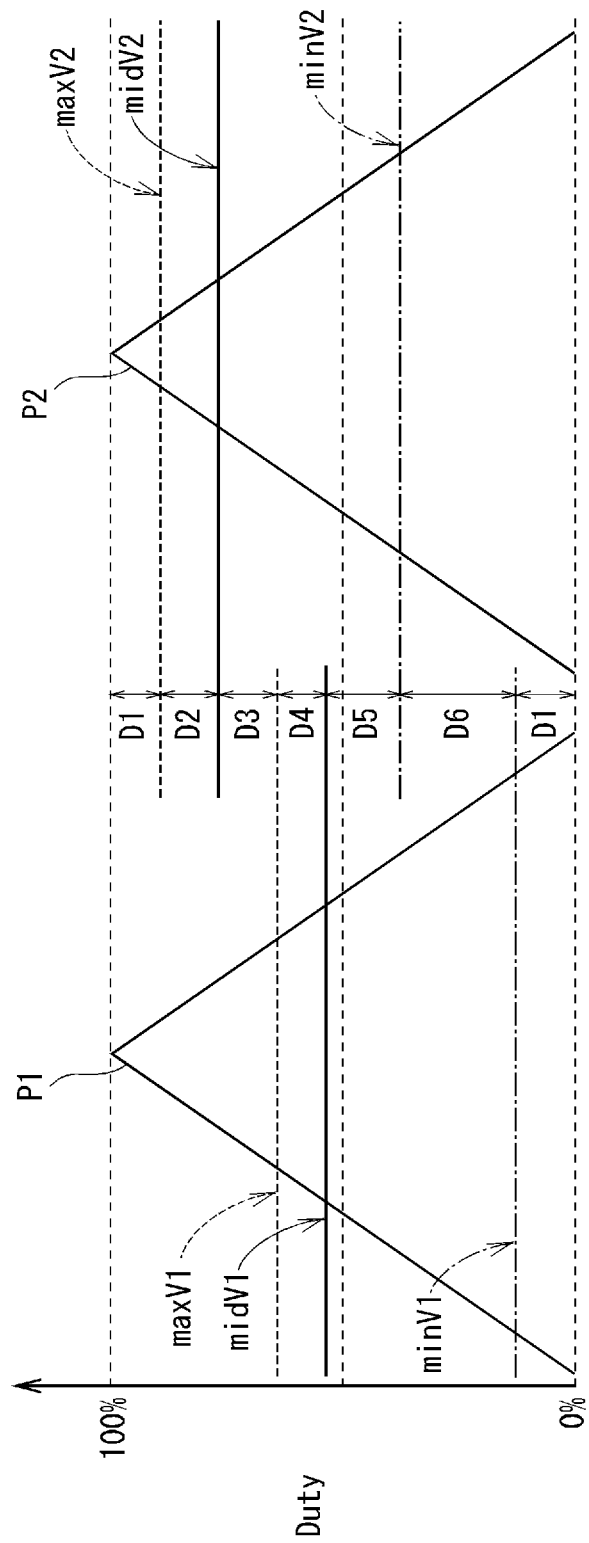
FIG. 14 shows yet another relationship diagram of the reference signal and the duty variable of the motor controller according to the second embodiment of the present disclosure.

The relationship between the duty variables D1 to D6 and maxV1, midV1, minV1, maxV2, midV2, minV2 at this time is shown in FIG. 14.

$$D1 = 100 - (D2 + D3 + D4 + D5 + D6) \tag{42}$$

$$D2 = \text{max}V2 - \text{mid}V2 \tag{43}$$

$$D3 = \text{mid}V2 - \text{max}V1 \tag{44}$$

$$D4 = \text{max}V1 - \text{mid}V1 \tag{45}$$

$$D5 = \text{mid}V1 - \text{min}V2 \tag{46}$$

$$D6 = \text{min}V2 - \text{min}V1 \tag{47}$$

In addition, the capacitor current estimating unit 252 calculates the current variables I1 to I6 as expressed by the following Relational Expressions (48) to (53).

$$I1 = Idc \tag{48}$$

$$I2 = Idc - \text{max}I2 \tag{49}$$

$$I3 = Idc - (\text{max}I2 + \text{mid}I2) \tag{50}$$

$$I4 = Idc - \text{max}I1 - (\text{max}I2 + \text{mid}I2) \tag{51}$$

$$I5 = Idc - (\text{max}I1 + \text{mid}I1) - (\text{max}I2 + \text{mid}I2) \tag{52}$$

$$I6 = Idc - (\text{max}I1 + \text{mid}I1) \tag{53}$$

In step 209, the capacitor current estimating unit 252 compares midV1 with minV2. Further, the capacitor current estimating unit 252 compares midV1 with midV2. Furthermore, the capacitor current estimating unit 252 compares maxV1 with minV2. Moreover, the capacitor current estimating unit 252 compares maxV1 with maxV2.

When midV1 is larger than minV2, midV1 is smaller than midV2, maxV1 is larger than minV2, and maxV1 is smaller than maxV2, the process proceeds to step 210.

When midV1 is equal to minV2 or less, midV1 is equal to midV2 or more, maxV1 is equal to midV2 or less, or maxV1 is equal to maxV2 or more, the process proceeds to step 211.

In step 210, the capacitor current estimating unit 252 calculates the duty variables D1 to D6 as expressed by the following Relational Expressions (54) to (59).

Figure 15:
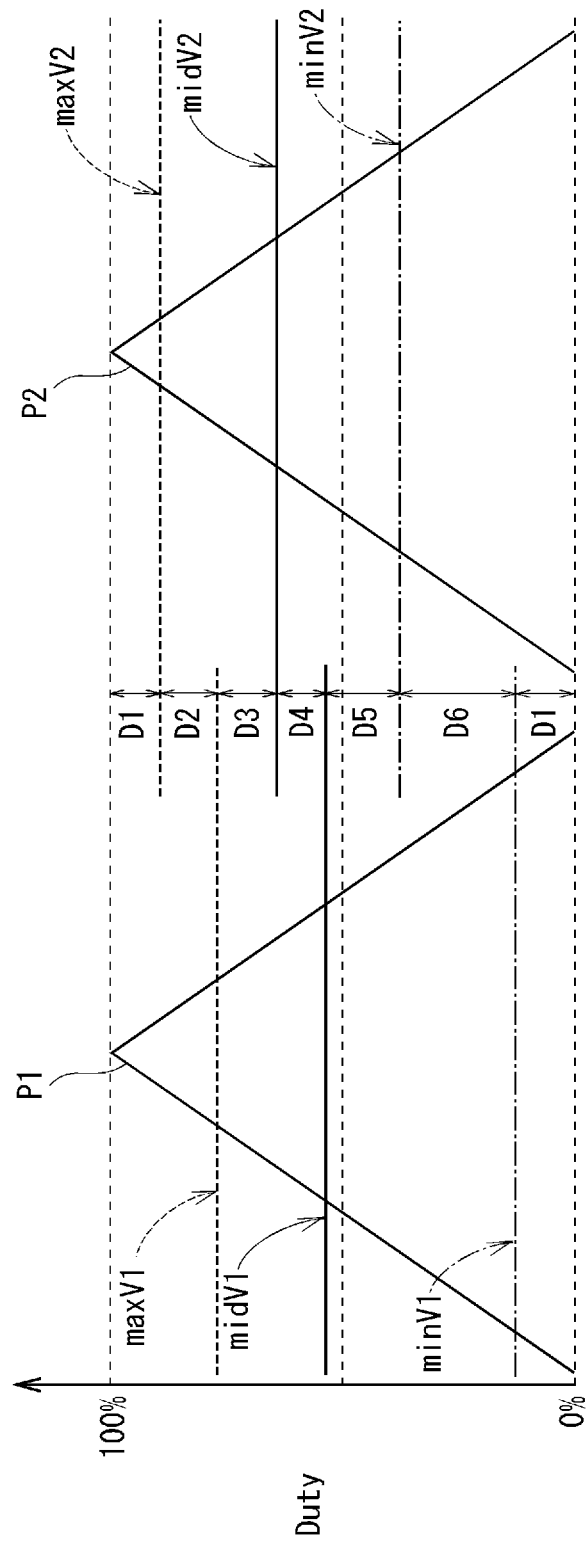
FIG. 15 shows further another relationship diagram of the reference signal and the duty variable of the motor controller according to the second embodiment of the present disclosure.

The relationship between the duty variables D1 to D6 and maxV1, midV1, minV1, maxV2, midV2, minV2 at this time is shown in FIG. 15.

$$D1 = 100 - (D2 + D3 + D4 + D5 + D6) \tag{54}$$

$$D2 = \text{max}V2 - \text{max}V1 \tag{55}$$

$$D3 = \text{max}V1 - \text{mid}V2 \tag{56}$$

$$D4 = \text{mid}V2 - \text{mid}V1 \tag{57}$$

$$D5 = \text{mid}V1 - \text{min}V2 \tag{58}$$

$$D6 = \text{min}V2 - \text{min}V1 \tag{59}$$

In addition, the capacitor current estimating unit 252 calculates the current variables I1 to I6 as expressed by the following Relational Expressions (60) to (65).

$$I1 = Idc \tag{60}$$

$$I2 = Idc - \text{max}I2 \tag{61}$$

$$I3 = Idc - \text{max}I1 - \text{max}I2 \tag{62}$$

$$I4 = Idc - \text{max}I1 - (\text{max}I2 + \text{mid}I2) \tag{63}$$

$$I5 = Idc - (\text{max}I1 + \text{mid}I1) - (\text{max}I2 + \text{mid}I2) \tag{64}$$

$$I6 = Idc - (\text{max}I1 + \text{mid}I1) \tag{65}$$

In step 211, the capacitor current estimating unit 252 calculates the duty variables D1 to D6 as expressed by the following Relational Expressions (66) to (71).

Figure 16:
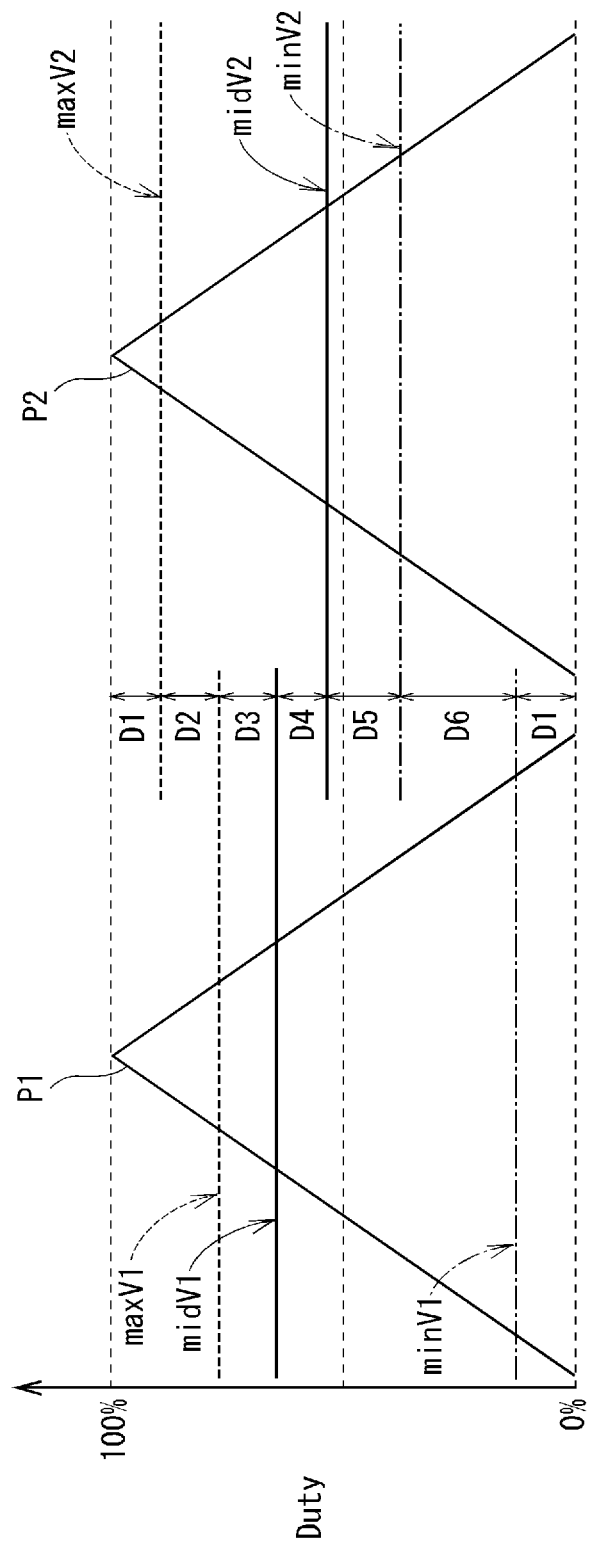
FIG. 16 shows further another relationship diagram of the reference signal and the duty variable of the motor controller according to the second embodiment of the present disclosure.

The relationship between the duty variables D1 to D6 and maxV1, midV1, minV1, maxV2, midV2, minV2 at this time is shown in FIG. 16.

$$D1 = 100 - (D2 + D3 + D4 + D5 + D6) \tag{66}$$

$$D2 = \text{max}V2 - \text{max}V1 \tag{67}$$

$$D3 = \text{max}V1 - \text{mid}V1 \tag{68}$$

$$D4 = \text{mid}V1 - \text{mid}V2 \tag{69}$$

$$D5 = \text{mid}V2 - \text{min}V2 \tag{70}$$

$$D6 = \text{min}V2 - \text{min}V1 \tag{71}$$

Further, the capacitor current estimating unit 252 calculates the current variables I1 to I6 as expressed by the following Relational Expressions (72) to (77).

$$I1 = Idc \tag{72}$$

$$I2 = Idc - \text{max}I2 \tag{73}$$

$$I3 = Idc - (\text{max}I1 + \text{max}I2) \tag{74}$$

$$I4 = Idc - (\text{max}I1 + \text{mid}I2) - \text{max}I2 \tag{75}$$

$$I5 = Idc - (\text{max}I1 + \text{mid}1) - (\text{max}I2 + \text{mid}I2) \tag{76}$$

$$I6 = Idc - (\text{max}I1 + \text{mid}I1) \tag{77}$$

Figure 11:
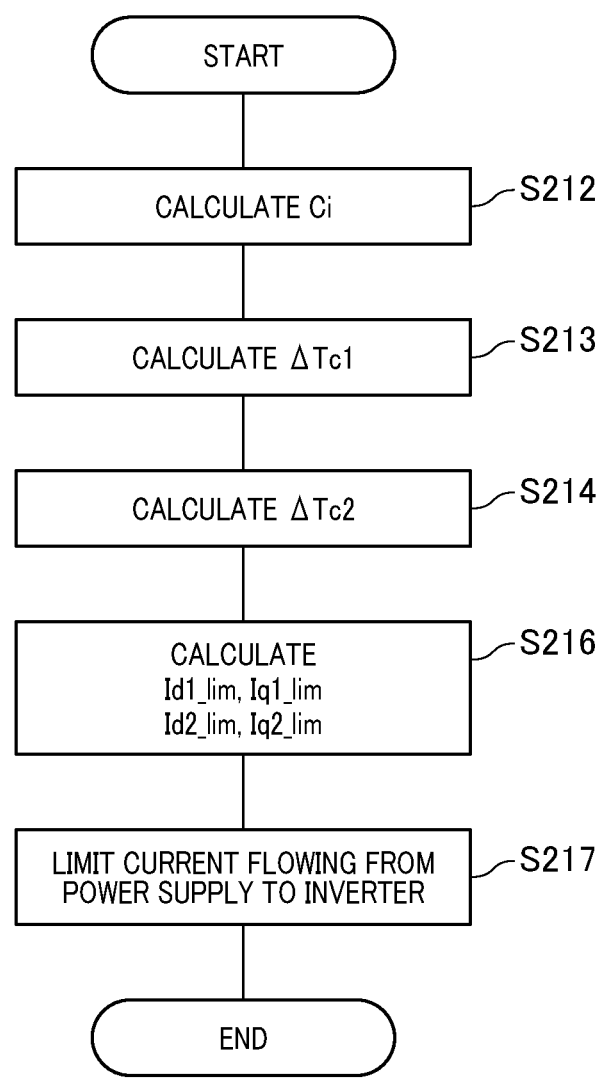
FIG. 11 shows another flowchart for explaining the processing of the control unit of the motor controller according to the second embodiment of the present disclosure.

As shown in FIG. 11, in step 212, the capacitor current estimating unit 252 uses the calculated duty variables D1 to D6, the current variables I1 to I6 and the following Relational Expression (78) in each step to calculate the current square integrated value Ci.

[Math 2]

$$Ci = \int (Ic)^2 dt = \frac{S \times (D1 \times I1^2 + D2 \times I2^2 + D3 \times I3^2 + D4 \times I4^2 + D5 \times I5^2 + D6 \times I6^2)}{100} \quad \text{Expression (78)}$$

In step 213, the first filter 56 performs filter processing on the current square integrated value Ci, and the capacitor temperature estimating unit 53 calculates the first temperature change amount $\Delta Tc1$.

In step 214, the second filter 57 performs filter processing on the current square integrated value Ci, and the capacitor temperature estimating unit 53 calculates the second temperature change amount $\Delta Tc2$.

In step 215, the capacitor temperature estimating unit 53 calculates the capacitor temperature Tc.

In step 216, the limiting current calculating units 254, 255 calculate the limiting currents Id1_lim, Iq1_lim, Id2_lim, and Iq2_lim based on the capacitor temperature Tc as in the first embodiment.

In step 217, the current limiting units 256, 257 limit the current flowing from the battery 9 to the inverter 11 based on the limiting currents Id1_lim, Iq1_lim, Id2_lim, Iq2_lim.

Effects similar to those of the first embodiment are obtained also in the second embodiment.

The amount of change in temperature may differ between when a plurality of systems are driven and when only one system is driven.

It is useful also in a case of providing a plurality of systems, and limits the current without considering a large amount of change in temperature.

Therefore, even in a plurality of systems, the excessive limiting of the current is avoided.

(i) The rotary electric machine is not limited to a three-phase AC motor, and may be a multiphase AC motor with four or more phases.

In addition, three or more sets of rotary electric machines may be used.

Further, a plurality of systems having three or more systems may be employed.

Furthermore, the rotary electric machine is not limited to a motor, but it may be a generator, or may be a motor generator having both functions of an electric motor and a generator.

(ii) The rotary electric machine and the rotary electric machine controller are integrally provided in the present embodiment.

However, the rotary electric machine and the rotary electric machine controller may be provided separately.

(iii) When there are a plurality of systems, the capacitor temperature may be calculated from the phase current of the one system and the capacitor temperature may be calculated for each system in order to select the highest capacitor temperature.

Thereby, the processing load can be reduced.

As described above, the present disclosure is not limited to such exemplary embodiment, and can be implemented in various forms without departing from the scope of the disclosure.

The invention claimed is:

1. A rotary electric machine controller for controlling a rotary electric machine having three or more phase having at least one winding set, the rotary electric machine controller comprising:

an inverter provided for each winding set respectively and having a plurality of switching elements, electric power is supplied to the inverter from a power supply;

a capacitor connected to the power supply configured to smooth a voltage of the power supply;

a current detecting unit that detects a current flowing through at least one winding set of the rotary electric machine;

a capacitor current estimating unit that estimates a current flowing through the capacitor based on the current flowing through the at least one winding set of the rotary electric machine;

a capacitor temperature estimating unit that estimates a temperature of the capacitor based on the estimated current flowing through the capacitor;

a limiting current calculating unit that calculates a limiting current which is a limiting value of a current flowing from the power supply to the inverter based on the temperature of the capacitor; and a current limiting unit that limits the current flowing from the power supply to the inverter based on the limiting current.

2. The rotary electric machine controller according to claim 1, wherein the limiting current is set so as to become smaller as the temperature of the capacitor increases.

3. The rotary electric machine controller according to claim 1, wherein when one set of ON and OFF states of the switching element is defined as a switching cycle and a ratio of an ON period with respect to the switching cycle is defined as a duty, and wherein the rotary electric machine controller further comprises:
a PWM (pulse width modulation) command value calculation unit that calculates the duty; and
a drive circuit that controls the inverter based on the duty, the capacitor current estimating unit estimates the current flowing through the capacitor based on the duty and the current flowing through the at least one winding set of the rotary electric machine.

4. The rotary electric machine controller according to claim 3, wherein the rotary electric machine controller further comprising:
a PWM reference signal generating unit that generates a reference signal corresponding to the duty; wherein
when an interval of one cycle of the reference signal is defined as a control cycle;
the plurality of switching elements include high-potential switching elements connected to a high potential line;
a ratio of a period when all the high-potential switching elements are on or when all the high-potential switching elements are off with respect to the control cycle is defined as an invalid period ratio; and
a ratio of a period when at least one of the high-potential switching elements is on and at least one of the high-potential switching elements is off with respect to the control cycle is defined as a valid period ratio;

the capacitor current estimating unit calculates the estimated current flowing through the capacitor based on the invalid period ratio and the valid period ratio.

5. The rotary electric machine controller according to claim 4,
wherein
when a ratio of a period when an odd number of the high-potential switching elements are on and at least one of the high-potential switching elements is off with respect to the control cycle is defined as an odd number period ratio; and
a ratio of a period when an even number of the high-potential switching elements are on and at least one of the high-potential switching elements is off with respect to the control cycle is defined as an even number period ratio,
the capacitor current estimating unit calculates the estimated current flowing through the capacitor based on the invalid period ratio, the odd number period ratio and the even number period ratio.

6. A rotary electric machine controller according to claim 1, wherein
the rotary electric machine controller further comprising:
a circuit board on which the inverter and the capacitor are mounted;
a heat sink that dissipates heat of the switching elements; and
a temperature detecting unit that detects a temperature of the circuit board, a temperature of the heat sink or an outside air temperature; wherein
when a temperature detected by the temperature detecting unit is defined as a detected temperature,
the capacitor temperature estimating unit estimates a temperature change amount of the capacitor based on the estimated current flowing through the capacitor, and estimates the temperature of the capacitor based on the temperature change amount of the capacitor and the detected temperature.

7. The rotary electric machine controller according to claim 1, wherein when a combination of the winding set and the inverter is defined as a system, the rotary electric machine controller includes a plurality of the systems.

8. The rotary electric machine controller according to claim 1, wherein
the current detecting unit detects the current flowing through the rotary electric machine from the inverter, through the inverter from the rotary electric machine, or at a point therebetween.

9. An electric power steering device comprising:
a rotary electric machine that outputs an assist torque for assisting steering by a driver; and
a rotary electric machine controller for controlling a rotary electric machine having three or more phase having at least one winding set; wherein
the rotary electric machine controller includes:
an inverter provided for each winding set respectively and having a plurality of switching elements, electric power is supplied to the inverter from a power supply;
a capacitor connected to the power supply configured to smooth a voltage of the power supply;
a current detecting unit that detects a current flowing through at least one winding set of the rotary electric machine;
a capacitor current estimating unit that estimates a current flowing through the capacitor based on the current flowing through the at least one winding set of the rotary electric machine;
a capacitor temperature estimating unit that estimates a temperature of the capacitor based on the estimated current flowing through the capacitor;
a limiting current calculating unit that calculates a limiting current which is a limiting value of a current flowing from the power supply to the inverter based on the temperature of the capacitor; and
a current limiting unit that limits the current flowing from the power supply to the inverter based on the limiting current.

* * * * *